(12) United States Patent
Mariano (10) Patent No.: US 10,948,100 B2
(45) Date of Patent: Mar. 16, 2021

(54) STEPPER VALVE WITH STEPPER VALVE MOTOR CONTROLLER

(71) Applicant: Michael Antonio Mariano, Rialto, CA (US)

(72) Inventor: Michael Antonio Mariano, Rialto, CA (US)

( * ) Notice: Subject to any disclaimer, the term of this patent is extended or adjusted under 35 U.S.C. 154(b) by 197 days.

(21) Appl. No.: 15/613,216

(22) Filed: Jun. 4, 2017

(65) Prior Publication Data

US 2018/0347720 A1 Dec. 6, 2018

(51) Int. Cl.
| | | |
|---|---|---|
| F16K 31/05 | (2006.01) | |
| F16K 31/04 | (2006.01) | |
| F16K 5/06 | (2006.01) | |
| E03B 7/07 | (2006.01) | |
| E03B 9/02 | (2006.01) | |
| G08C 17/02 | (2006.01) | |
| E03B 7/04 | (2006.01) | |

(52) U.S. Cl.
CPC ............ *F16K 31/055* (2013.01); *E03B 7/075* (2013.01); *E03B 9/025* (2013.01); *F16K 5/0652* (2013.01); *F16K 31/042* (2013.01); *F16K 31/043* (2013.01); *F16K 31/05* (2013.01); *E03B 7/04* (2013.01); *G08C 17/02* (2013.01); *G08C 2201/30* (2013.01); *G08C 2201/31* (2013.01); *G08C 2201/32* (2013.01)

(58) Field of Classification Search
CPC .... F16K 5/0647; F16K 5/0652; F16K 31/042; F16K 31/043; F16K 31/05; F16K 31/055; E03B 7/075

See application file for complete search history.

(56) References Cited

U.S. PATENT DOCUMENTS

| | | | | |
|---|---|---|---|---|
| 6,279,870 B1* | 8/2001 | Welz, Jr. | ............. | F16K 27/0218 251/129.04 |
| 6,708,083 B2* | 3/2004 | Orthlieb | ............. | G05D 23/1934 236/46 R |
| 8,342,478 B1* | 1/2013 | Cordray | ............. | F16K 37/0075 137/554 |
| 2003/0030337 A1* | 2/2003 | Aoki | ..................... | F16K 31/041 310/68 R |
| 2009/0321674 A1* | 12/2009 | Madden | ................ | F16K 5/0647 251/313 |
| 2012/0085951 A1* | 4/2012 | Ludwig | ................. | F16K 5/0207 251/129.04 |

(Continued)

FOREIGN PATENT DOCUMENTS

WO WO-9322714 A1 * 11/1993 ........... G05D 11/139

*Primary Examiner* — Ryan A Reis (57) ABSTRACT

Apparatus is provided for electro-mechanically fluctuating the position of a ball valve/ball valve stem. The said apparatus can electronically turn the ball valve smoothly and effectively to any position in response to the input signal provided by a microcontroller interfacing with a motor driver controller. The apparatus control inputs will range from: voice command, push buttons, motion sensor, android, and/or touchscreen. An input means to send signals to the microcontroller, which send a signal to the stepper motor driver circuit, which send a signal to control the Stepper motor, which will maneuver a machined made driveshaft to operate the momentum of the ball valve/ball valve shaft for accurate and precise liquescent output.

15 Claims, 8 Drawing Sheets

(56) References Cited

U.S. PATENT DOCUMENTS

| | | | |
|---|---|---|---|
| 2012/0132838 A1* | 5/2012 | Staffiere | F16K 31/055 251/129.01 |
| 2012/0298902 A1* | 11/2012 | Ma | F16K 5/0652 251/315.03 |
| 2013/0015381 A1* | 1/2013 | Husick | F16K 31/055 251/251 |

* cited by examiner

| ITEM NO. | DESCRIPTION | QTY |
|---|---|---|
| 1 | UNIPOLAR / BIPOLAR STEPPER MOTOR | 1 |
| 2 | GEARBOX | 1 |
| 3 | COUPLING / DRIVESHAFT | 1 |
| 4 | BALLVALVE (HOSE BIB) | 1 |
| 5 | BALLVALVE STEM | 1 |

FIG. 3B

| ITEM NO. | DESCRIPTION | QTY |
|---|---|---|
| 1 | UNIPOLAR / BIPOLAR STEPPER MOTOR | 1 |
| 2 | GEARBOX | 1 |
| 3 | COUPLING / DRIVESHAFT | 1 |
| 4 | BALLVALVE | 1 |
| 5 | BALLVALVE STEM | 1 |
| 6 | EMERGENCY MANUAL SHUT-OFF | 1 |

STEPPER VALVE WITH STEPPER VALVE MOTOR CONTROLLER

BACKGROUND OF THE INVENTION

Ball Valve's has been the most successful and outlasting valves compared to any other valve in the world. A ball valve is a quarter turn valve that uses a perforated pivoting ball to control the flow through it. Over time, ball valves have been utilized for air, water, gas, and oil. Other valves failed to last because of the wear and tear of the diaphragm, needle, springs or poor construction. This mostly occurs from a particular valves repetitious use. Ball valves are preferred because of the excellent seal it provides and its increased resistance to wear. Also, ball valves are utilized because the "valves not made to extend vertical and are smaller in diameter compared to other rotary valves.

The Stepper Motor is a brushless and DC operated electromagnetic apparatus that converts digital pulses into a mechanical shaft rotation. Stepper motors divide a full rotation into a certain number of steps and can range from micro stepping to full stepping procedures. Stepper motors also allow precise positioning control without the need of a feedback system as well as being capable of continuous rotation.

BRIEF SUMMARY OF VARIOUS EMBODIMENTS OF THE INVENTION

The "Stepper Valve" now makes it possible to achieve any pressure, temperature, mixing purpose, mixing colors, and/or turn on or off the ball of the valve by use of an electronic control system. Various embodiments of the invention include a said stepper motor, a said gearbox, a said drive shaft, ball valve, and a stated motor controller system to operate the "Stepper Valve". The "Stepper valve Motor Controller" is optional because the "Stepper Valve" can also be controlled by any microprocessor, PLC, or computer. The said apparatus will also operate on low voltages which makes it easier for setup on an abundance of systems. Step Valve devices will range from 5 to 24 volts. Voltages may be subjected to change depending on valve size and the torque required for operation.

In a particular embodiment, the motor controller is assembled with a power supply, a microprocessor, and a motor driver. The motor driver is used to control the Step valves in multiple step angles. It also has multiple controls to save how much water, air, gas, or liquid you want to output from the apparatus. The motor controller can be operated by physical buttons or any ways of wireless communication, for example: Bluetooth or Wi-Fi. The stepper motor can also be controlled using a voice command control, an electronic switch, android, or a motion sensor. The motor controller can accurately and precisely count each step that the "Step Valve" is given which gives the consumer the power to accurately and precisely measure pressure, mix temperatures, mix chemicals, mix air/fuel ratio, or to turn valve on or off.

Various embodiments may include variations in the shape, material, construction method, size of various constructed machined parts, gearbox, stepper motor, and/or ball valve used in conjunction with the "Stepper Valve". Various embodiments may also allow for variations in the of the electronic components used in conjunction with the "Stepper Valve Motor Controller".

DETAILED DESCRIPTION OF VARIOUS EMBODIMENTS

Various embodiments of the invention are described more fully hereinafter with reference to the accompanying drawing, in which some, but not all embodiments of the invention are shown in the figures. Indeed, these inventions may be embodied in many different forms and should not be construed as limited to the embodiments set forth herein; rather, these embodiments are provided so that this disclosure will satisfy applicable legal requirements.

Figure 1A:
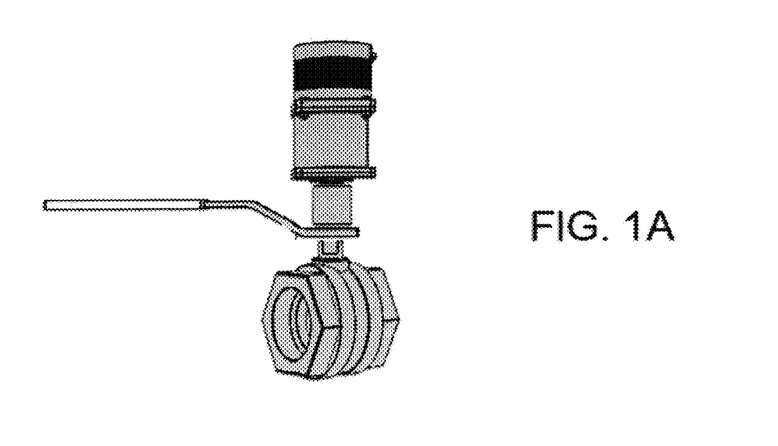
FIGS. 1A and 1B illustrates two versions of the "STEPPER VALVE" according to various embodiments of the invention
Figure 1B:
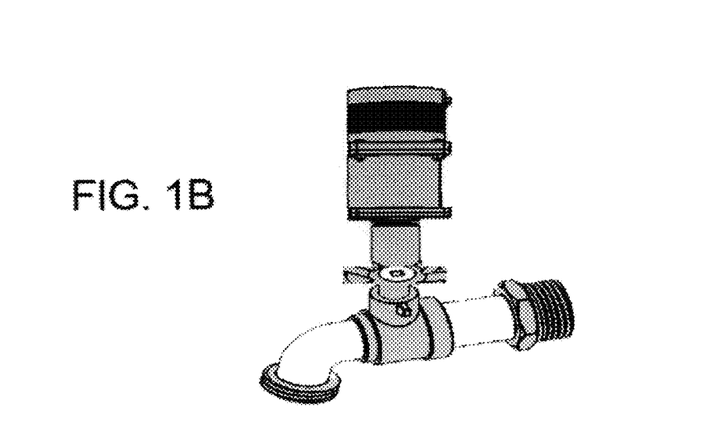

FIG. 1-A Illustrates two of the main embodiment of the invention. As shown, a "Stepper Valve" includes a stepper motor, a ball valve, an emergency manual shutoff, and a drive shaft. These are 5 of the major components that make up the "Stepper Valve". The "Stepper Valve was designed to last with no interchangeable parts. There's no diaphragms, no washers to ever change, or no needles or wore out springs to change or replace. You can control either "Stepper Valve" by means of the "Stepper Valve Controller" or any other system that can control a stepper motor. The "Stepper Valve" Controller" is optional, which is programmed to operate the "Stepper Valve's" full operation. FIG. 1-A illustrates the "Stepper Valve" used for indoor/outside use. It can be Used to control any and all water faucets in your home/office kitchen or bathroom. Other specific areas that the "Stepper Valve". "Stepper Valve" and controller (or the "Stepper Valve" alone) can be utilized for range from following: Precisely regulate inside water distribution, Main line automatic shut-off, all water shutoff and regulation solutions, precisely regulate any and all gas measurements (or automatic gas shutoff/turn on), also can precisely measure and regulate air pressure), and multiple other system uses. FIG. 1-B illustrates the "Stepper Valve" used for outdoor use. The "Stepper Valve" and controller (or the "Stepper Valve" alone) can be utilized from a range of the following:

Precisely regulate outside water distribution, water hose (hose bib), Water Mist distribution system (plants), and multiple other system uses.

Figure 2A:
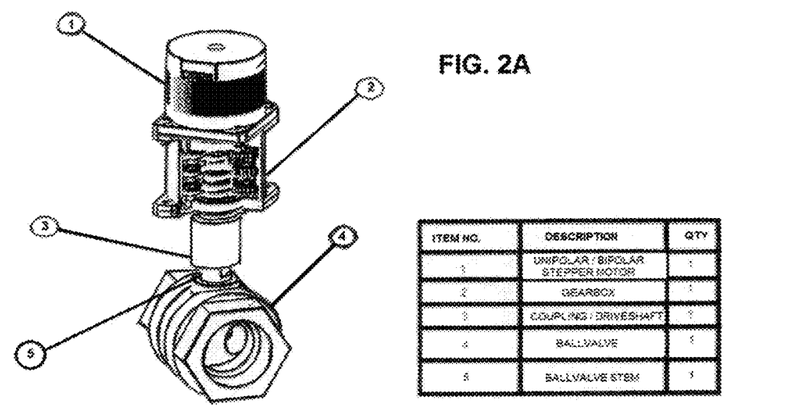
FIGS. 2A and 2B illustrates two versions of the "STEPPER VALVE" designed for indoor/outdoor use according to various embodiments of the invention
Figure 2B:
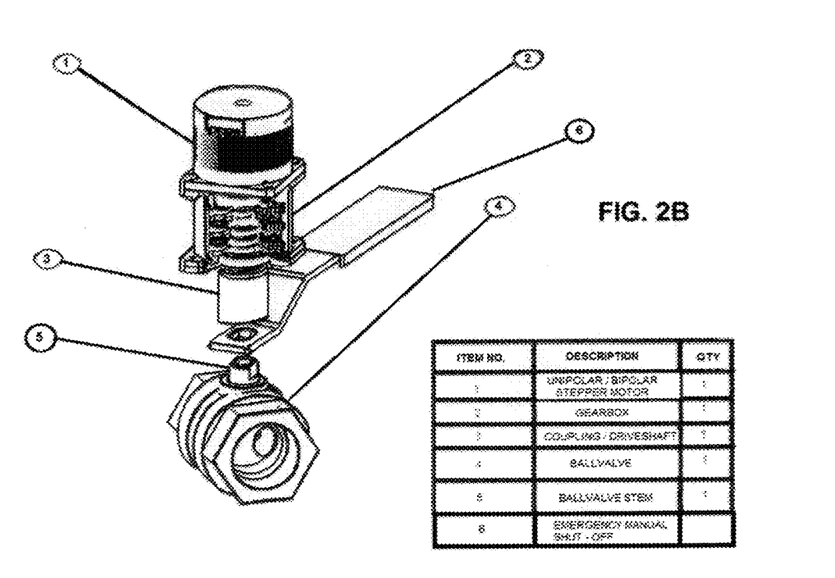

FIG. 2 Illustrates a diagram and the "Stepper Valve" for indoor/outdoor use according to the various embodiments of the invention. FIG. 2-A display the "Stepper Valve" without emergency shut-off. FIG. 2B display the "Stepper Valve" assembled with emergency shut-off (5). This diagram depicts the parts used to make the apparatus functional. This particular "Stepper Valve" is designed for indoor/outdoor use. The stated "Stepper Valve" was created with a unipolar or bipolar stepper motor (1), a precisely ratio gearbox (2), and a ball valve (4). The gearbox is assembled to the shaft of the stepper motor. The gearbox (2) shaft is then connected to a machined cylinder housing, the coupling/driveshaft (3), to join the gearbox (2) shaft to the ball valve (4). The coupling/driveshaft (3) which is then secured to both sides (the gearbox and the ball valve (4)) by machined screws. This was done to create smoother operations and maximum torque delivery. In order to turn the ball valve (4) to a precise angle, the stepper motor (1) turn ratio had to be changed to a smaller step size. For this to work a gearbox (2) had to be implemented to decrement the step ratio from 1.8 degrees to 0.018 degrees' step size. On behalf of The high torque "Step Valve", the step size was achieved by making the gear box's (2) gear ratio achieve 100 steps to the said stepper motor (1) original one step 1.8\100=0.018. On behalf of a fast speed "Step Valve", the step size was achieved by making the gear box's (2) gear ratio achieve 50 steps to the said stepper motor (1) original one step 1.8\50=0.036. When there was no gearbox (2) present, the step ratio would be too big and turn the "Step Valve" in 2 revolutions, at highest four revolutions. The "Step Valve" is designed to a user's preference. Each "Step Valve" is designed for any area of distribution that can be controlled by a ball-valve (4). The specific areas that the "Step Valve" and "Step Valve Motor Controller" (or the "Step Valve" alone) can be utilized for range from following: Precisely regulate inside/outside water distribution (sprinkler, water hose, (hose bib).

It can be Used to control any and all water faucets in your home kitchen or bathroom/office. Other specific areas that the "Step Valve" and "Step Valve Motor Controller" (or the "Step Valve" alone) can be utilized for range from following: Main line automatic shut-off, sprinkler, all water shutoff and regulation solutions, precisely regulate any and all gas measurements (or automatic gas shutoff/turn on), also can precisely measure air pressures and also regulate the pressure), and multiple other system uses.

Figure 3A:
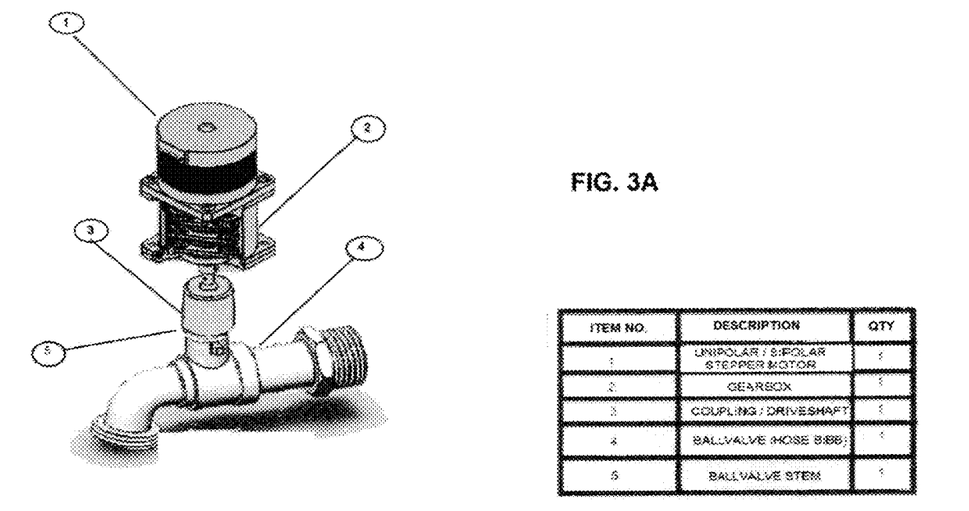
FIGS. 3A and 3B illustrates two versions of the "STEPPER VALVE" designed for outdoor use according to various embodiments of the invention
Figure 3B:
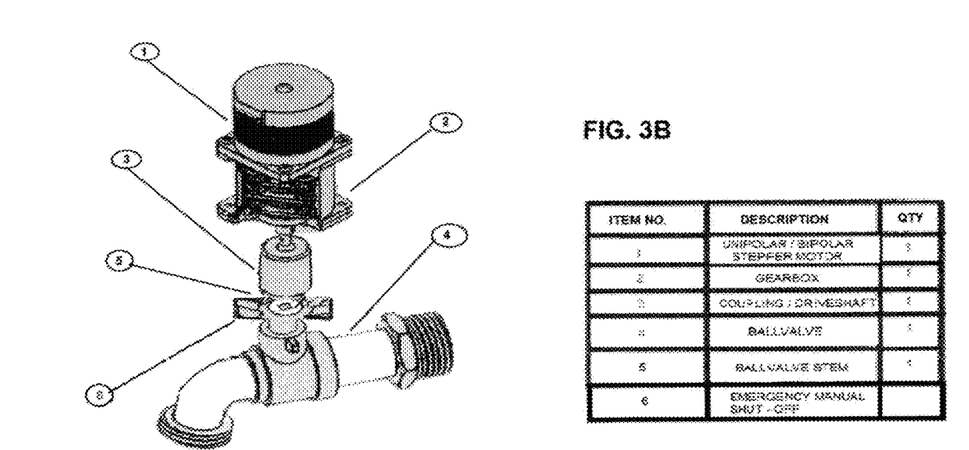

FIG. 3 Illustrates a diagram and the "STEPPER VALVE" for outdoor use according to the various embodiments of the invention. FIG. 3A display the "STEPPER VALVE" without emergency shut-off. FIG. 3B display the "STEPPER VALVE" assembled with emergency shut-off (5). This diagram depicts the parts used to make the apparatus fully functional. This specific "STEPPER VALVE" is designed for outdoor use. The "STEPPER VALVE" was created with a unipolar or bipolar stepper motor (1), a precisely ratio gearbox (2), and a ball valve (4). The gearbox (2) is assembled to the shaft of the said stepper motor (1). The gearbox (2) shaft is then connected to the shaft of the ball valve (4) by way of a machined cylinder housing. The machined housing is constructed as a coupling/drive shaft (3) which is then connected to the shaft of the gearbox (2) by machined screws. This was done to create smoother operations and maximum torque delivery. In order to turn the ball valve (4) to a precise angle, the said stepper motor (1) turn ratio had to be changed to a smaller step size. For this to work a gearbox (2) had to be implemented to decrement the step ratio from 1.8 degrees to 0.018 degrees' step size. On behalf of The high torque "Stepper Valve", the step size was achieved by making the gear box's (2) gear ratio achieve 100 steps to the said stepper motor (1) original one step 1.8\100=0.018. On behalf of a fast speed "Stepper Valve", the step size was achieved by making the gear box's (2) gear ratio achieve 50 steps to the said stepper motor (1) original one step 1.8\50=0.036 When there was no gearbox (2), the step ratio would be too big and turn the Step Valve in 2 revolutions, at highest four revolutions. The Step Valve is designed to a user's preference. Each "Step Valve" is designed for any area of distribution that can be controlled by a ball-valve (4). The specific areas that the "Stepper Valve" and "Stepper Valve Motor Controller" (or the "Stepper Valve" alone) can be utilized for range from the following: Precisely regulate outside water distribution (sprinkler, water hose, (Hose Bibb) and all water shutoff and regulation solutions. It can be Used to control any and all water faucets outside your home/office. Other specific areas that the "Step Valve" and controller (or the "Step Valve" alone) can be utilized for range from following: Precisely regulate Water Mist distribution system (plants), Water Drip Systems, Swamp cooler and multiple other system uses.

Figure 4:
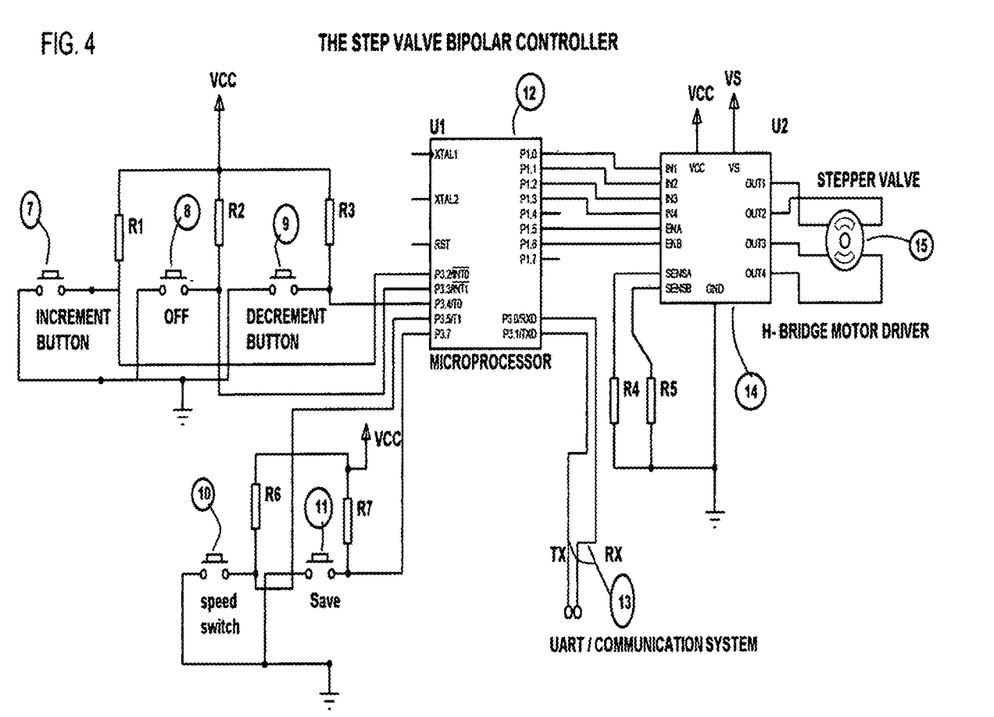
FIG. 4 illustrates an embodiment of a bipolar stepper motor driver circuit according to various embodiments of the invention.

FIG. 4 Illustrates one embodiment of the invention, as shown, you see a microcontroller, a full h-bridge motor driver (14), control switches (7,8,9,10,11), and a UART system (13) to provide control from wired and/or wireless communication. Other communication, such as, I2C, SPI, and any other system that is invented within the time span of this patent can also be utilized with the "Step Valve". Wireless communication ranging from, IR, Bluetooth, ZIG-BEE, AND XBEE will be utilized to transmit and receive data from UART (13). A Bipolar Stepper motor has to use a full h-bridge (14) in order to operate. This is because the coils of the bipolar motor (15) have to switch polarity every single step that it takes to achieve the next step. The microcontroller (12) used can be any microcontroller but as seen, the microcontroller (12) is an 8-bit processor. The microcontroller (12) controls, motor speed, motor rotation, saved step data, and full control of the "Stepper Valve". The buttons (7, 8, 9, 10, and 11) in the picture are there for the purpose of depicting switches. The motor controller (14) will be operated by voice commands, touchless sensing, touch screen, and/or push buttons. The Increment switch (7) will allow the user to adjust the "Stepper Valve" step by step in the on position until the user has reached their preference. The decrement switch (9) will allow the user to adjust the "Stepper Valve" in increments towards the off position until the user has reached their preference. By pressing the off switch (8) once, this will allow the user to fully close the valve despite its position. The speed switch (10) is used to adjust from the various different motor speeds programmed to the microcontroller (12). The speed switch (10) was created to control how fast or slow you want the "Stepper Valve" rotation speed. The save switch (11) was added if the user has a pressure/valve position that he/she would like to be saved for future operation.

Figure 5:
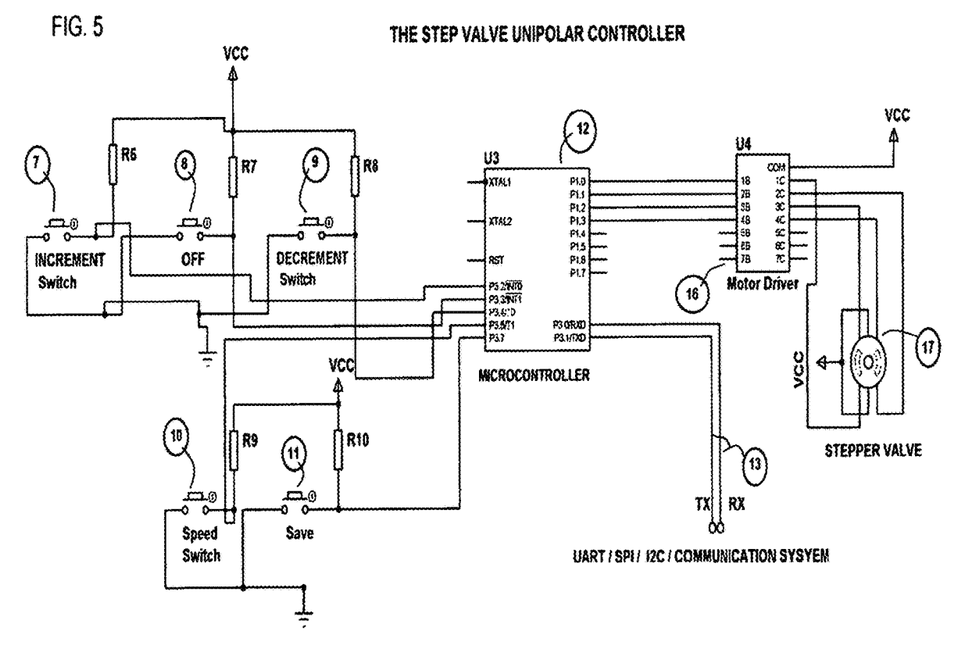
FIG. 5 illustrates an embodiment of a unipolar stepper motor driver circuit according to various embodiments of the invention.

FIG. 5 Illustrates one embodiment of the invention, as shown, you see a microcontroller (12), Darlington Pair IC driver (16), control switches (7, 8, 9, 10, 11), and a UART (13) system to provide control from wired and/or wireless communication. Other communication, such as, I2C, SPI, and any other system that is invented within the time span of this patent can also be utilized with the "Step Valve". Wireless communication ranging from, IR, Bluetooth, ZIG-BEE, AND XBEE will be utilized to transmit and receive data from UART (13). This specific "Stepper Valve Motor Controller" was invented because a Unipolar Stepper (17) can be operated by using A basic transistor, Darlington Pairs, or Drivers that utilizes Darlington Pairs (16). Reason being is because the coils of the Unipolar Stepper motor (15) does not switch polarity every single step that it needs to achieve. Instead, the Unipolar Stepper Motor (17) has a center tap That is energized by the power source, and do to that, all the Stepper motor needs to operate is a latched ground switch of the same power source of the "STEPPER VALVE". Which is why the Darlington Pair IC (16) was utilized in Unipolar operation. The microcontroller (12) used, can be any microcontroller, but as illustrated, the microcontroller (12) is a 8 bit processor. The microcontroller controls, motor speed, motor rotation, saved data, and full control of the "STEPPER VALVE". The buttons (7, 8, 9, 10, 11) in the picture are there for the purpose of depicting switches (only used in example). The "Stepper Valve Motor Controller" can and will be operated by, voice commands, touchless sensing, touch screen, and/or push buttons. The Increment switch (7) will allow the user to, adjust the "STEPPER VALVE" step by step in the on position, until the user has reached their preference. The decrement switch (9) will allow the user to, adjust the "STEPPER VALVE" step by step in the off position, until the user has reached their preference. The off switch (8) will allow the user to shut the valve off completely. By pressing the off switch (8) once, this will allow the user to fully close the valve despite its position. No matter what position it's in, the "STEPPER VALVE" will turn off completely. The speed switch (10) is to adjust from the various different motor speeds programmed to the microcontroller (12). The speed regulation switch (10) was set to control how fast or slow you want the "STEPPER VALVE" rotation speed. The save switch (11) was added for if the user has a pressure/temperature that wants to be saved for normal operation.

Figure 6:
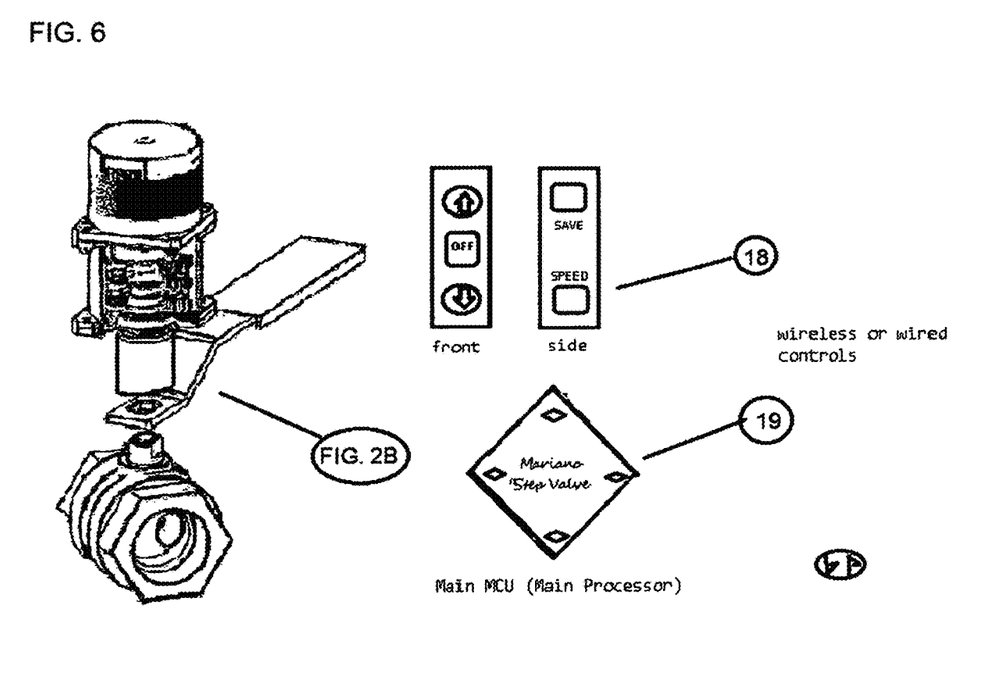
FIG. 6 illustrates a "STEPPER VALVE" designed for indoor/outdoor use, the Motor Controller, and the Main Processor Unit enclosed in its housing according to various embodiments of the invention.

FIG. 6 illustrates a "Stepper Valve" designed for indoor/outdoor use (FIG. 2B), the Motor Controller switches (18), and the Main Processor Unit (19) enclosed in its housing according to various embodiments of the invention. The "Stepper Valve Motor Controller" will be equipped with multiple controller options to choose from. According to various embodiments the "Stepper Valve Motor Controller" is assembled with a power supply, a microprocessor/microcontroller (12), and a motor driver. The motor driver (14 or 16) is used to control the Step valves in multiple step angles. It also has multiple controls to save how much water, air, gas, or liquid, the user wants to output from the apparatus. The "Stepper Valve Motor Controller" can be operated by physical buttons or any ways of wireless communication, for example: Bluetooth or Wi-Fi. The "Stepper Valve" can also be controlled using a voice command control, an electronic switch, or a motion sensor. The motor controller can accurately and precisely count each step that the "STEPPER VALVE" is given which gives the consumer the power to accurately and precisely measure pressure, mix temperatures, mix chemicals (dry or liquid), mix air/fuel ratio, or to turn "Stepper Valve" on or off automatically. The illustration depicts the "Stepper Valve" and the "Stepper Valve Motor Controller". Shown is the indoor/outdoor "Stepper Valve" (FIG. 2B)". The said "Stepper Valve Motor Controller", for any and all e"Stepper Valve's". can look exactly the same on the outside. The difference is the integrated circuit driving the motor. The Bipolar "Step Valve" use a h-bridge controller (14), while the Unipolar uses a transistor/Darlington Pair (16). All control's will operate the exact same whether unipolar or bipolar "Stepper Valve". The Bipolar "Stepper Valve" is for higher torque operations. The Unipolar "Stepper Valve" is for Higher speed.

Figure 7:
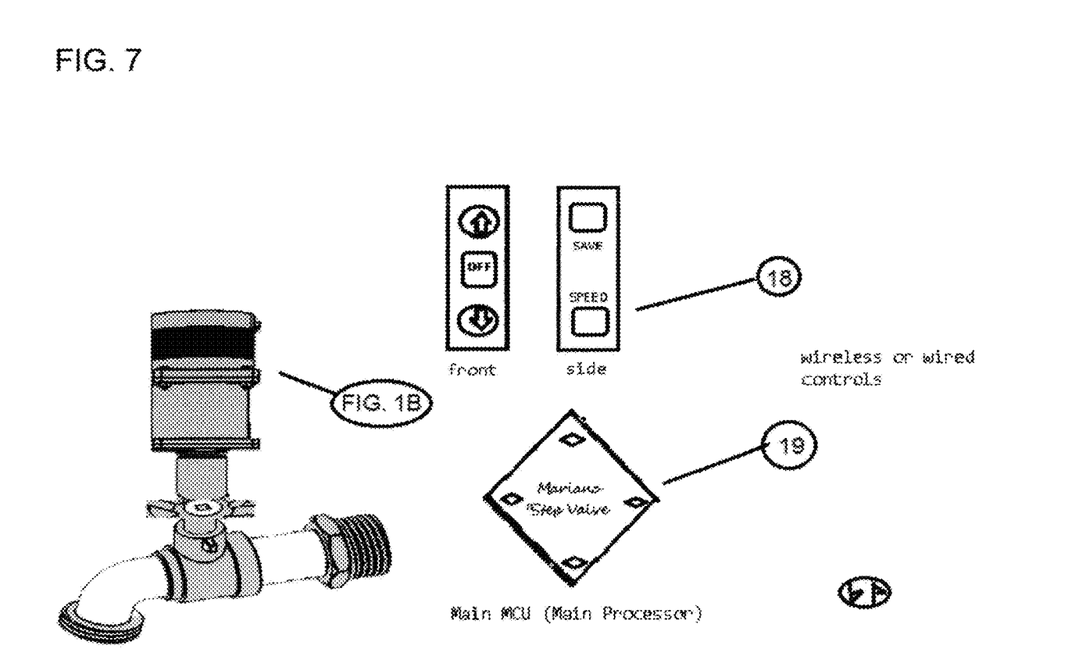
FIG. 7 illustrates a "STEPPER VALVE" designed for outdoor use, the Motor Controller, and the Main Processor Unit enclosed in its housing according to various embodiments of the invention.

FIG. 7 illustrates a "Stepper Valve" designed for outdoor use (Hose Bibb) type (FIG. 1B) the Motor Controller switches (18) and the Main Processor Unit (19) enclosed in its housing according to various embodiments of the invention. The "Stepper Valve Motor Controller" will be equipped with multiple controller options to choose from. According to various embodiments the "Stepper Valve Motor Controller" is assembled with a power supply, a microprocessor/microcontroller (12, and a motor driver (14 or 16). The motor driver (14 or 16) is used to control the Step valves in multiple step angles. It also has multiple controls to save how much water, air, gas, or liquid, the user wants to output from the apparatus. The "Stepper Valve Motor Controller" can be operated by physical buttons or any ways of wireless communication, for example: Bluetooth or Wi-Fi. The "Stepper Valve" can also be controlled using a voice command control, an electronic switch, or a motion sensor. The microcontroller (12) can accurately and precisely count each step that the "Stepper Valve" is given which gives the consumer the power to accurately and precisely measure pressure, mix temperatures, mix chemicals (dry or liquid), mix air/fuel ratio, or to turn "Stepper Valve" on or off automatically. The illustration depicts the "Step Valve" and the "Stepper Valve Motor Controller". Shown is the indoor/outdoor "Stepper Valve" (FIG. 1B)". The said "Stepper Valve Motor Controller", for any and all "Stepper Valve" can look exactly the same on the outside. The difference is the integrated circuit driving the motor. The Bipolar "Step Valve" use a h-bridge controller (14), while the Unipolar uses a transistor/Darlington Pair IC (16). All control's will operate the exact same whether unipolar or bipolar "Stepper Valve". The Bipolar "Step Valve" is for higher torque operations. The Unipolar "Stepper Valve" is for Higher speed.

Figure 8:
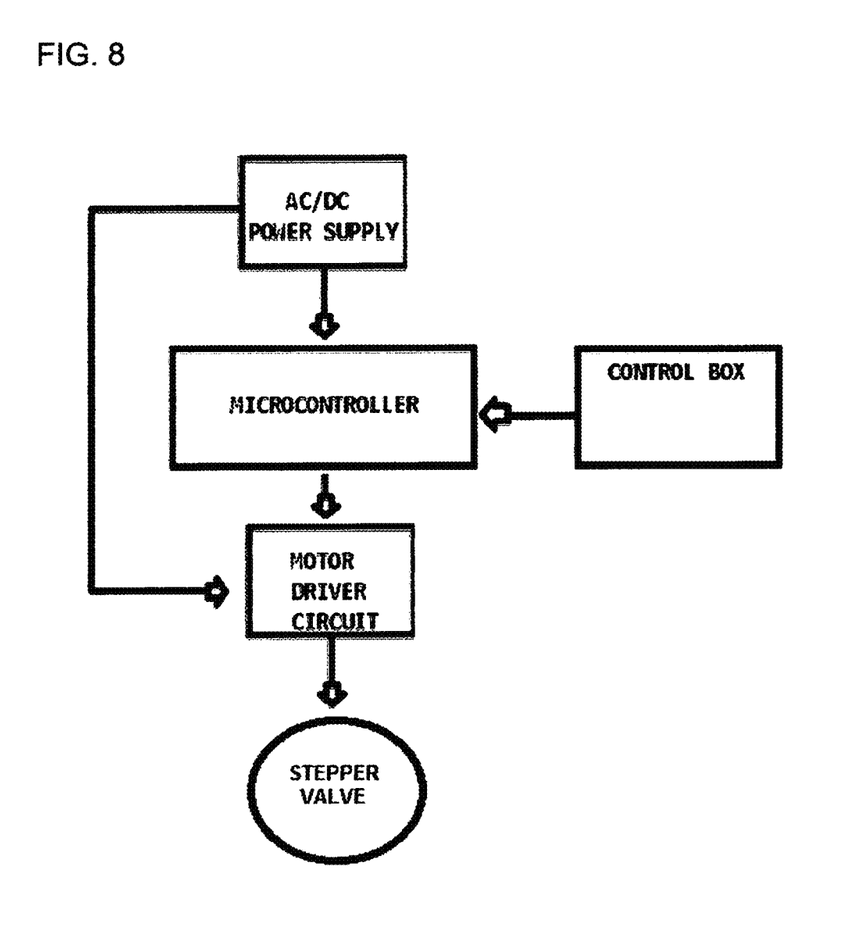
FIG. 8 illustrates a block diagram, concerning the assembly of, the "STEPPER VALVE" and its Motor Controller shown in FIG. 6 and FIG. 7.

FIG. 8 illustrates a Block Diagram of the ""Stepper Valve" and "Stepper Valve Motor Controller" circuit according to various embodiments of the invention. Many Stepper motors operate at various speeds and will output a certain amount of torque. Most voltages that the "Stepper Valve" will operate within is between the ranges of 5 to 24 volts. Depending on the Type of ""Stepper Valve" being used will determine the "Stepper Valve" voltage supply needs. Depicted in (FIG. 1-A), If "Stepper Valve" "FIG. 1-B" was utilized for a water hose bib, the torque needed to rotate the ½ inch or ¾ inch ball would need a 5 volt 0.17-amp Dc power supply to operate the "Stepper Valve". For instance, if the ball valve took 31 Lbs. per newton meter to effectively rotate the valve, the stepper motor needed would need to output at least twice the amount of torque as the ball valve needs to operate.

CONCLUSION

The World that we live in today is innovating rapidly. Saving water while saving time by way of the "Stepper Valve" is mandated. According to various embodiments of this invention, "The Stepper Valve" and the "Stepper Valve Motor Controller" will control all home/business plumbing needs. The "Stepper Valve", whether use is for hot or cold-water supply, indoor or outdoor, or whether using the "Stepper Valve" for preferred Pressure regulation or temperature, will move precisely and accurately to the position the user require. Home and Business automation with the "Stepper Valve" with or without the "Stepper Valve Motor Controller" will substantially set you at ease financially (water bill) and keep the user stress free by accessing your water more conveniently. In the Industry of Plumbing today the need for easier application is essential. The "Stepper Valve" will allow all users to save preferred pressure or temperature by one press of an input. Also allowing user to operate said "Stepper Valve" by one press of an input. Such said inputs include: voice command, motion sensors, touchscreen, and push buttons to control the said apparatus. The "Stepper VALVE" can and will be utilized for electronic distribution of not just water, but also oil, air, steam, and any other distribution that's controlled/or can be controlled by a ball valve. Please take into consideration that this, electronically operated ball valve, will and/or can be controlled by any apparatus that can control a stepper motor. The "Stepper Valve" will replace all regular ball valves in the near future.

In Conclusion, Various embodiments may include variations in the shape, material, construction method, size of various constructed machined parts, gearbox, stepper motor, and/or ball valve used in conjunction with the "Stepper Valve". Various embodiments may also allow for variations in the design of the electronic components used in conjunction with the "Stepper Valve Motor Controller".

The invention claimed is:

1. A motorized valve with an adjustable gearbox, comprising: an actuating device, which receives multiple signals from a controller to convert digital pulses into variable speed mechanical shaft rotation to proportionally actuate a ball valve, the actuating device connected to an adjustable gearbox to adjust actuating speed of the ball valve; the adjustable gearbox being manually adjustable to a plurality of different gear pattern settings to vary the speed or torque of the ball valve; a driveshaft which links the adjustable gearbox to the ball valve; an emergency shut-off handle connected to the ball valve for shutting off the ball valve manually in case of emergency; wherein the motorized valve electronically and proportionally outputs a precise fluid temperature, a specific valve position, and/or a precise fluid pressure.

2. The motorized valve with an adjustable gearbox of claim 1, wherein the actuating device is a servo motor or a stepper motor.

3. The motorized valve with an adjustable gearbox of claim 1, wherein the emergency shut-off handle is constructed as a fixed device.

4. The motorized valve with an adjustable gearbox of claim 1, wherein the motorized valve is constructed with a hose-bib type valve system and/or a multi-port valve system.

5. The motorized valve with an adjustable gearbox of claim 1, wherein the emergency shut-off handle is constructed as a removable device.

6. The motorized valve with an adjustable gearbox of claim 1, wherein the controller includes visual, auditory and/or tactile outputs to indicate the status of the motorized valve.

7. The motorized valve with an adjustable gearbox of claim 1, wherein the controller has a user interface constructed with one or more motion sensors, touchscreen devices, microphone inputs, and/or switches.

8. The motorized valve with an adjustable gearbox of claim 1, wherein the controller communicates with the motorized valve wirelessly.

9. The motorized valve with an adjustable gearbox of claim 1, wherein the controller is implanted on a smart phone and/or a computation device.

10. The motorized valve with an adjustable gearbox of claim 1, wherein the controller has batteries and/or a solar panel powered battery charging system.

11. The motorized valve with an adjustable gearbox of claim 1, wherein the controller is housed in a water utility facility to monitor and/or control a local supply of water at the motorized valve.

12. The motorized valve with an adjustable gearbox of claim 1, wherein the controller monitors and/or control a shower and/or tub.

13. The motorized valve with an adjustable gearbox of claim 1, wherein the controller monitors and/or controls a sink and/or faucet.

14. The motorized valve with an adjustable gearbox of claim 1, wherein the controller monitors and/or controls a sprinkler system.

15. The motorized valve with an adjustable gearbox of claim 7, wherein the user interface is constructed with one or more transceivers and a sound system for transmitting and receiving music audio files.

* * * * *